Feb. 5, 1963 E. WILDHABER 3,076,322
UNIVERSAL JOINT
Filed Feb. 27, 1961 2 Sheets-Sheet 1

INVENTOR:
Ernest Wildhaber

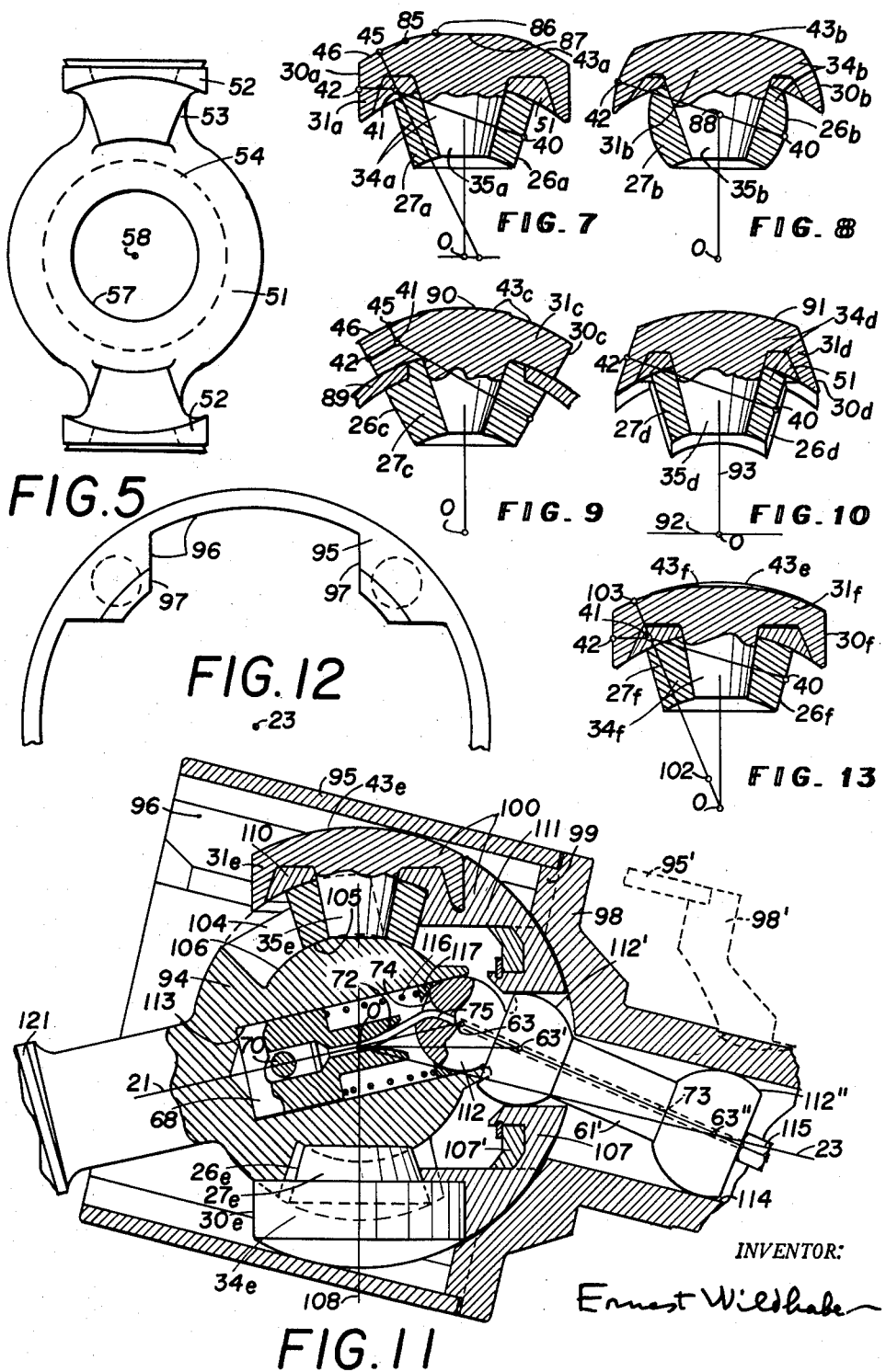

United States Patent Office 3,076,322
Patented Feb. 5, 1963

3,076,322
UNIVERSAL JOINT
Ernest Wildhaber, Brighton, N.Y.
(124 Summit Drive, Rochester 20, N.Y.)
Filed Feb. 27, 1961, Ser. No. 91,796
19 Claims. (Cl. 64—21)

The present invention relates to universal joints and particularly to universal joints of the constant velocity type.

One object thereof is to provide a universal joint of increased load capacity and durability by eliminating or reducing sliding between the contacting surfaces in accordance with the principles described and claimed in my Patent No. 2,662,381 granted December 15, 1953, while using a simplified, more compact and more rigid construction. I have found a way to apply these principles also to universal joints whose ways have bottoms connecting their side surfaces rather than being mere slots without bottoms, whereby increased rigidity is achieved.

A further object is to gain strength by using more than two large two-part rollers, each engaging one way of an outer and an adjacent way of an inner joint-member, where said two-part rollers are separate from all other two-part rollers of the universal joint, and further where the parts of each such roller are pivotally mounted on each other. To these ends I shape the rollers so that no tilting moment is exerted on the two-part roller and that axial thrust is taken up at a most favorable place.

A further aim is to gain rigidity and save cost by providing an outer and inner joint member that contact each other directly on a spherical surface, without the customary precision cage therebetween through which said members have to be centered on one another, while still having retaining means to hold said rollers.

A still other aim is to provide an improved constraint for maintaining the rollers in the bisector plane of the axes of said outer and inner members, and furthermore a constraint that facilitates assembly of the universal joint.

Other objects will appear in the course of the specification and in the recital of the appended claims.

In the drawings:

FIG. 5 is a front view of the same retaining member, looking from left to right in FIG. 1.

FIGS. 7 and 8 are axial sections of modified forms of rollers such as may be used in the universal joint of FIG. 1. They are partly side views looking in the direction of the roller motion and showing also sections through the retainers.

FIG. 9 is a similar axial section and side view of a further two-part roller that requires however a conventional cage.

FIG. 10 is an axial section, partly a side view, of a two-part individual sliding block that may be substituted for the roller shown in FIG. 1, looking in the direction of the sliding motion.

FIG. 11 is an axial section similar to FIG. 1 of a universal joint that permits relative displacement along the axis of the outer member.

FIG. 12 is a fragmentary end view of the outer member of this joint, looking from left to right in FIG. 11.

FIG. 13 is an axial section and side view of a slightly modified roller that may be used in the universal joint shown in FIGS. 11 and 12.

Figures 1, 4:
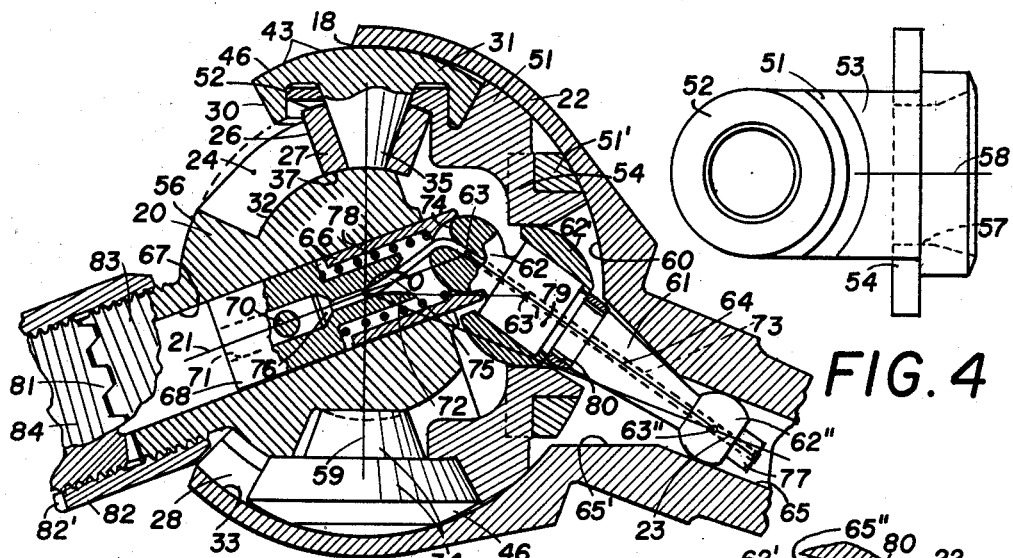
FIG. 1 is an axial section of a universal joint embodying the invention, shown at shaft angularity. The sectional plane contains the axes of the two members connected by the joint.
FIG. 4 is a side view of the retaining member shown in FIG. 1, looking downwardly in FIG. 1.

The universal joint shown in FIGS. 1 to 5 comprises an inner member or ball head 20 with axis 21 and an outer member or socket member 22 with axis 23. The axes 21 and 23 intersect at the joint center O. The ball head 20 contains ways 24 that extend about center O and are uniformly spaced about its axis 21. The side surfaces of a way 24 are engageable by the outside surface 26 of a roller 27 whose axis passes through center O. The outer member 22 has internal ways 28 also extending about center O. The side surfaces and end surface of a way 28 (FIG. 2) are surfaces of revolution with axis 28'. Its sides are engageable by the outside surface 30 of a roller 31 coaxial with a roller 27 and rotatable relatively thereto.

The ways 24, 28 are symmetrical with respect to axial planes of the respective member.

It has been shown in the patent referred to that if the rollers roll on their ways without sliding the two coaxial rollers turn with respect to each other, even if the cone angle of the two rollers is the same. By mounting one roller rotatable on the other the rollers are enabled to roll on their ways, rather than roll and slide thereon. They have increased load capacity and longer life. While in said patent the ways were slots without bottoms, opposite side surfaces of the ways 24, 28 have bottoms 32, 33 connecting them, to achieve a more compact and rigid design. Here the connecting elements 34 comprising the two-part rollers 27, 31 are separate from all other like connecting members of the universal joint. There is no connection between diametrically opposite elements to mount them on each other. The outer roller 31 has a tapered pivot 35 engaged by a matching bore of roller 27. Pivot 35 extends within the confines of element 34 without projecting beyond. It may be equally or less tapered than the outside surface 26 of roller 27.

Roller 27 has a concave spherical end surface 37 adapted to contact the convex spherical bottom surface 32 of a way 24.

The pressure exerted on roller 27 by its way extends approximately in the direction of the surface normal 40—41 (FIG. 2) at a mean point 40 of its working surface 26. It is opposed by pressure exerted at mean point 42 on roller 31. This pressure extends approximately in the direction of the surface normal 42—41. The said two forces have different directions and require additional force for balance, obtainable by contact of the roller end surface 43 with the bottom 33 of a way 28. This additional force extends inwardly approximately in the direction of the surface normal 45—41 at mean point 45 of a ring-shaped portion 46 of end surface 43. There is also some guiding pressure at shaft angularity.

Normal 45—41 bypasses the joint center O. It intersects the axis 28' of way 28 at a point 47, and it intersects the roller axis 48 at a point 50 between O and surface 46. The two points 47 and 50 are close together, their distance being preferably within one quarter of the distance of point 47 from point 45 and from surface 46. In a section perpendicular to the plane of FIG. 2, laid through normal 45—41, the roller surface 46 and the bottom surface portion engaged thereby have profiles whose curvature centers are at 50 and 47. They have convex and concave curvature radii 45—50 and 45—47 respectively. In this peripheral section then the contacting surfaces hug each other closely. In the axial section shown in FIG.

2 the surfaces contact along the convex profile of the roller surface 46 without or with some ease-off at the ends. Thus the roller surface 46 may be made a convex spherical surface centered at 50, and the engaged portion of the bottom surface of a way may be made a concave spherical surface centered at 47.

The entire conical working surface 30 of roller 31 rolls on its way without sliding, while there is some sliding at end surface 46. Sliding increases with increasing distance from surface 30 and is small because the distance is small. The convex on concave contact at end surface 46 is intimate so that these contacting surfaces have low surface stresses and can very well stand the moderate amount of sliding.

The diameter and taper of the rollers are chosen in such relation to one another that the intersection point 41 of the normals 40—41 and 42—41 is inside of the working surface 30 and adjacent thereto. Point 41 has a distance 42—41 from surface 30 smaller than a quarter of the distance of point 42 from the roller axis 48, which distance is the mean roller radius. This to keep sliding low.

To the inside of ring-shaped surface 46 the end surface 43 contains a spherical portion centered at O. It is matched by a concave spherical portion of the bottom 33 of way 28, also centered at O.

Figures 2, 3:
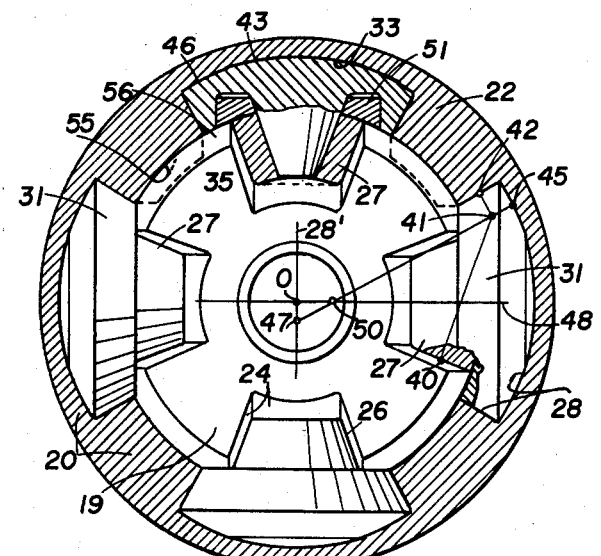
FIG. 2 is a cross-section of the universal joint shown in FIG. 1, with the axes in alignment. It is also partly an end view looking left in FIG. 1.
FIG. 3 is an axial section of a retaining member of said joint.

Each pair of diametrically opposite elements 34 is guided by its own retainer that is movable with respect to other retainers. Retainer 51 holds the elements 34 with vertical axis in the drawing, while retainer 51' holds those with horizontal axis. FIG. 3 shows an axial section of retainer 51'.

Each element 34 is held in place by a ring-shaped holding portion 52 located at the end of an arm 53 or 53'. An individual retainer 51, 51' has a pair of opposite arms 53, 53' projecting from a central disk or ring body 54, 54' respectively. Holding portion 52 is recessed into the outer roller 31 and contacts either the inside of the rim of roller 31 or its pivot 35 or both. The arm that connects a portion 52 with the central body extends within the ways of the two members adjacent its forward part, and its width is made so as to clear the sides and ends of the ways in all positions of operation and assembly.

The spherical inside surface 55 of outer member 22 directly contacts the spherical outside surface 56 of the ball head 20, so that said members are thereby centered axially as well as radially on each other directly, without an interposed cage. Also the width of the conventional cage is gained for the rollers.

Retainer 51 has a central bore 57 whose axis 58 passes through joint center O and is to be kept at right angles to the plane 59 that bisects the angle between the axes 21, 23 and that is referred to as the bisector plane. Retainer 51' is mounted to turn on retainer 51 about axis 58. Its rear contacts member 22 at the spherical inside surface 60 centered at O. The pair of retainers are further held axially through the rollers, whose large end surfaces contact the spherical bottom surfaces of the ways of both members. This roller contact keeps the rollers as well as the retainers axially aligned.

Maintaining Rollers in Bisector Plane

The roller axes are maintained in the bisector plane 59 by an improved version of a known constraint. The known constraint contains a lever 61 carrying three ball portions 62, 62', 62" centered at 63, 63', 63" respectively. The said centers lie on a straight line, the axis 64 of lever 61. The ball portions 62', 62" of lever 61 are movable in the bores 57, 65 of retainer 51 and outer member 22 respectively, so that the ball centers 63', 63" move on the axes 58, 23. Ball center 63 lies on the axis 21 of the ball head.

Figure 6:
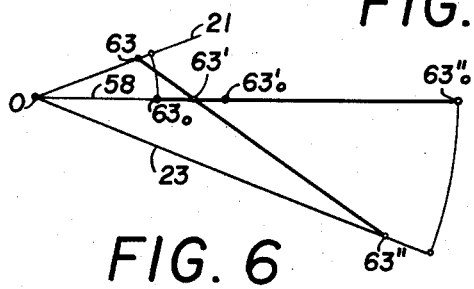
FIG. 6 is a diagram explanatory of the principles of the improved means for maintaining the rollers or connecting elements in the bisector plane of the axes of the universal joint.

In the known constraint center 63 is fixed to the ball head, whereas in the present constraint it is movable axially thereof to positions made dependent on the angularity of the axes 21, 23. The underlying principle will now be described with diagram FIG. 6.

$63_0$, $63'_0$, $63''_0$ are the positions of the ball centers at zero shaft angularity, when the axes 21, 23 coincide. Their distances $b=63_0$—$63'_0$; $c=63'_0$—$63''_0$ from each other and distance $a=O$—$63_0$ from the joint center O are so computed that at small shaft angularities center 63' lies on the bisector of the shaft angle. This is fulfilled when $$a = b \cdot \frac{c+b}{c-b}$$

as known.

When distance $a=O$—63 is fixed an error is incurred at large shaft angularities, so that point 63' ceases to divide the angle between the axes 21, 23 into two equal parts. It is no longer on the bisector. However a distance $x=O$—63 can be computed for any shaft angle within the design limit, such that point 63' lies exactly on the bisector, while retaining the distances $b$, $c$. Distance $x$ can also be determined by trial on the drawing board: Assume a point 63 on axis 21. Then plot distance $(c+b)$ from the assumed point 63 to obtain a point 63" on axis 23. Change the location of point 63 on axis 21 until the connecting line 63—63" intersects bisector axis 58 at a distance $b$ from point 63.

It is found that this distance $x$ decreases with increasing shaft angularity. It decreases very slowly when the shaft angularity is small; and it decreases more rapidly at large shaft angularities. Exactly uniform motion is transmitted by the univeral joint when center 63 is kept at this varying distance $x$ from center O. And the same motion is transmitted by the several pairs of diametrically opposite elements 34. When the roller axes are however maintained in a plane differing from the bisector plane, varying motion is transmitted by each pair of elements. This varying motion is in a different phase on the several pairs of elements, so that they tend to move the driven member differently and some binding occurs. The improvement does away with binding and at the same time establishes transmission of more exactly uniform motion.

Ball portion 62 is pivotally mounted in a sleeve 66 that is slidable in a bore 67 of ball head 20. A cylindrical part 68 fitting bore 67 is fixed therein by a pin 70 that passes through a hole drilled through the ball head and through part 68. Pin 70 is suitably secured. Part 68 has a bore 71 with tapered end, and a smaller bore starting at said end. The smaller bore has a convex flared profile 72 at its opposite end. Ball portion 62 also has a small bore, 73, with flared end 74 of convex profile. Bore 73 extends all through lever 61 at the small diameter or partway with enlarged diameter.

A flexible cable 75 of steel or other material is connected to a tapered head 76 that seats on the tapered end of bore 71. Cable 75 extends through said smaller bore and flared end 72 to the flared end 74 and bore 73. After passing through the ball portion 62, cable 75 is welded or otherwise secured to a rod that extends through the remainder of the bore 73. A nut 77 threads onto the end of said rod and rests on the flat end of ball portion 62". It is set to keep the ball center 63" at a predetermined distance from pin 70 when the lever axis 64 is aligned with the axis 21 of part 68, to achieve the aforesaid distance $a=O$—$63_0$ at zero shaft angularity.

A spring 78 exerts pressure between fixed part 68 and sleeve 66 to keep cable 75 under some tension. It should be noted that it is applied at the ball (62) with the least axial displacement, and that it applies increased pressure at increased shaft angularity, as desired.

At shaft angularity the cable 75 is bent between points O and 63, so that ball center 63 is approached to joint center O by the difference of the length of its curved center line from chordal distance O—63. This approach is at a rate that is very small at small shaft angularities, but that increases with increasing shaft angularity, as required. By suitably shaping and positioning the flares 74, 72 the required displacement x can be achieved.

Cable 75 keeps the lever 61 attached to the ball head 20. It carries only moderate load, the main guiding loads being at right angles to the plane of the axes 21, 23, (FIG. 1).

Although ball portion 62' is part of lever 61, it is not formed integral with it for reasons of assembly of the universal joint. It is mounted on a cylindrical portion 79 of lever 61 and is held axially between a shoulder at portion 79 and a snap ring 80.

Assembly

The ball head 20 is connected with a shaft by a toothed face coupling 81 held in engagement by a sleeve 82. Sleeve 82 engages threads 83, 84 of opposite hand, provided on one end of the ball head and on the adjacent enlarged shaft portion respectively. Sleeve 82 contains teeth 82' for adjustment. The universal joint is assembled before the ball head 20 is connected with said shaft.

The coaxial retainers 51, 51' are inserted into the outer member 22 to contact spherical surface 60 with their rear ends, and ball portion 62' is also inserted. The axis 23 of member 22 may be kept vertical. Then the ball head 20 is introduced with its teeth 19 (FIG. 2) aligned with the ways 28 of member 22, and with its axis 21 aligned with axis 23. It is then turned on its axis 21 to align its ways 24 with the ways 28 and is then set to its maximum shaft angularity shown in FIG. 1. An inner roller 27 is inserted into the way 24 shown at the upper left of FIG. 1. The retainers 51, 51' are not yet held in their bisector position and are now further tilted until an outer roller 31 can be inserted through ring 52 into engagement with its inner roller 27, past edge 18 of member 22. The retainers with the inserted element are then moved back to their bisector position. The members 20, 22 are turned on their axes to move adjacent ways into the described position shown in FIG. 1. An inner roller 27 is inserted. The retainers are moved forward to permit insertion of an outer roller past edge 18; and so on until all elements 34 are inserted.

The bisector constraint means are now inserted through the bore 67 of ball head 20, with ball 62" of lever 61 ahead. Ball 62" is made to pass into and through the bore of the ball portion 62' which is made to rest on the tapered flare 65' of member 22. As lever 61 is pressed through said bore the snap ring 80 is first compressed and then expands after passing the end of ball portion 62' to hold the ball portion axially after expansion. For practical purposes lever 61 now acts as if rigid with all its three ball portions.

When part 68 has reached a given distance from the coupling end the pin 70 is passed through a bore provided in ball head 20 and part 68 and axially secured therein This completes the assembly.

A bisector constraint that can be inserted after all the elements 34 are in place enables us to use a one-piece outer member 22 with spherical inside surface, thus saving cost and increasing rigidity. This member would otherwise have to be made in two parts.

Modifications

FIGURES 7 to 9 illustrate other forms of two-part rollers that may be used in place of elements 34 in the universal joint described with FIGS. 1 to 5, when the cross-section of the ways 24, 28 is adapted to that of the rollers.

The connecting element 34a (FIG. 7) has an outer roller 31a with cylindrical working surface 30a, a pivot 35a, and a tapered inner roller 27a. Like roller 31, roller 31a has a ring-shaped end surface 46 and a spherical end surface portion 43a centered at the joint center O and whose profile extends between the points 85, 86. The central end-surface portion 87 is a plane. 51 is the ringpart of the retainer.

The preferred taper of the working surface 26a of the inner roller 27a is determined as described with FIG. 2. The normal 40—41 at mean point 40 intersects the normal 42—41 at mean point 42 of the outer roller at a point 41 inside of surface 30a and adjacent thereto. Normal 45—41 at mean point 45 of end surface portion 46 is offset from the center O of the universal joint.

Element 34b (FIG. 8) contains a pair of rollers 31b, 27b with spherical working surfaces 30b, 26b both centered at 88. Here the normals 40—88, 42—88 at the mean points 40, 42 are directly in line with each other, so that there is little end pressure on this element. Its end surface 43b is a sphere centered at O.

Element 34c (FIG. 9) comprises a pair of conical rollers 31c, 27c mounted on each other. Both working surfaces 30c, 26c lie here in the same conical surface with apex O, and the elements are guided by a conventional cage 89. The described ring-shaped end surface 46 is also provided. The mean normals 40—41, 42—41 and 45—41 intersect at 41. Roller 31c contains a spherical end surface portion 90 shown raised slightly and centered at O.

The shown tapered pivots (35a, 35b) represent the preferred structure. However other forms of pivotal connection could also be used. Also the outer roller could be embodied as a socket member seating the inner roller.

FIG. 10 shows an element 34d embodied as a two-part sliding block. It could be used in the described universal joint when the cross-section of the ways conforms to that of the sliding blocks. The outer block 31d with pivot 35d is equally and oppositely tapered as compared with the inner block 27d, so that the normal 40—42 at mean point 40 coincides with that at mean point 42. The end surface 91 of block 31d is a spherical surface centered at O. Its side surfaces 30d and the side surfaces 26d of block 27d are conical surfaces such as may be described by rotating the block profiles about an axis 92 perpendicular to the pivot axis 93. Numeral 51 denotes the retainer.

The profiles of the rollers of sliding blocks may be crowned if desired. Also the tapered bores of the inner rollers may be lined with suitable bearing material, or needle bearings may be used.

Figure 14:
FIG. 14 shows an alternative detail.

In some instances it may be desired to also disassemble the universal joint shown in FIG. 1. If such an opportunity is desired I may modify the flared end 65' of member 22 to a shape 65" shown in FIG. 14. This figure shows the lever 61 aligned with the axis 23 of member 22 and the ball portion 62' in contact with the flared end 65" during assembly. In this position the snap ring 80 is prevented from expanding by bore 65, while it is free to expand in the embodiment already described.

In assembly the axis 23 is set upright, with ball portion 62 at the lower end of lever 61. Lever 61 with ball portion 62' is then withdrawn axially, whereupon the snap ring expands and secures portion 62'. Portion 62' is shaken loose first if it tends to stick in the taper bore, so that it moves out with lever 61.

To take the universal joint apart the ball portion 62' is pressed hard into the taper hole 65", so that it sticks there. Lever 61 is then moved out through the ball portion. To facilitate this operation a running fit is provided between cylindrical portion 79 and ball portion 62', and the bore 71 of part 68 is preferably threaded.

In a further modification an enlarged bore 67 (FIG. 1) is used, so that a one-piece lever 61 can be passed through.

Axially Free Universal Joint

An application of the invention to axially free universal joints will be described with FIGS. 11 and 12.

Universal joint 100 comprises a ball head 94 similar to ball head 20 and an outer member 95 with axis 23. The outer member 95 has straight ways 96 with plane sides 97 parallel to axis 23. Opposite sides 97 of a way are connected by a cylindrical bottom with axis 23.

Member 95 is secured at one end to a head 98 by screws or other means. Head 98 has projections 99 engaging the adjacent end of the ways 96. Dotted lines 95', 98' show member 95 and head 98 in a position displaced along axis 23 relatively to the ball head 94. The universal joint operates properly in both and in all intermediate positions.

Universal joint 100 contains four connecting elements 34e, each comprising an outer roller 31e on whose pivot 35e a tapered inner roller 27e is rotatably mounted. The roller 31e has a spherical end surface 43e centered at O. FIG. 13 shows a slightly modified element 34f that may be used in place of element 34e and that is a refinement thereof. The end surface 43f of its outer roller 31f has a profile that is tangent to the circular arc profile of sphere 43e and slightly more curved than the sphere profile. Its curvature center is at 102, at a moderate distance from center O, to provide an end contact centered at 103. The taper of the inner roller 27f, as also that of roller 27e is preferably so selected that the mean normal 40—41 intersects the mean normal 42—41 of the cylindrical outside surface 30f at a point 41 inside of and close to said cylindrical surface. Moderate end pressure along normal 103—41 takes up the axial thrust component.

The working surface 26e of roller 27e is adapted to engage the sides of a way 104, while the concave spherical inner end surface 105 of roller 27e contacts the convex spherical bottom surface 106 of way 104. Both said spherical surfaces are centered at O. The ways 104 extend about center O, and their side surfaces are conical surfaces.

The two pairs of diametrically opposite elements 34e are held by two retainers 107, 107' that are movable relative to each other about axis O—63' kept perpendicular to the bisector plane. The retainers 107, 107' are formed on the principles described for retainers 51, 51' and are mounted on one another. They contain ring portions 110 recessed into the outer rollers 31e, and arms connecting the ring portions of each retainer with a central portion.

The constraint for maintaining axis O—63' at right angles to the bisector plane is based on the described principles. Lever 61' contains three ball portions 112, 112', 112" centered at 63, 63', 63" respectively. Ball portion 112' is formed integral with lever 61', as the assembly presents no problem.

Ball portion 112 rests directly in the bore 113 of the ball head 94. Ball portion 112" fits the bore 114 of head 98. Again there is a flexible cable 75, attached at one end to a part 68 kept rigid with the ball head 94 by a pin 70. It passes through the flared opening 72 of part 68 and enters a central bore 73 of lever 61' through the flared opening 74 of curved profile, provided at the end of ball portion 112. Its continuation is held at the opposite end by a screw 115. A spring 116 exerts pressure between part 68 and ball portion 112 through a washer 117. The adjustment of cable 75 and the operation of the constraint is the same as described.

To assemble, the retainers 107, 107' are removed over the ball head 94 with their axis O—63' aligned with the axis 21 of the ball head and their arms aligned with the ways of the ball head. The inner rollers 27e are then inserted to the ways 104 while the retainers are kept tilted out of the way. The inner rollers and the retainers are aligned, and the outer rollers 31e are inserted with their pivots passing through the ring portions 110 into the bore of the inner rollers. The constraint means 63, 61' are inserted to the bore 113 from the front of the ball head; and part 68 is secured to the ball head by pin 70. Then the entire inner joint assembly is inserted into the outer member 95, with the rollers 31e entering the ways 96 and ball portion 112" entering bore 114 of head 98.

The ball head 94 may be secured to a shaft by a toothed coupling, as described, of which the threaded portion 121 is a part.

The elements 34e and their retainers are kept aligned on the ball head 94 by the contact of the inner rollers with the spherical bottom surface 106 of the ways 104. This contact is maintained by the contact of the outer rollers 31e with the cylindrical bottoms of the ways 96.

*Production*

The ways of the ball heads 20, 94 may be milled or ground simultaneously on both sides and the bottom by a milling cutter or grinding wheel of the shape of the inner roller. This tool is rotated and fed about the joint center O relatively to the workpiece exactly like the roller moves bodily along its way.

The internal ways 28 of the outer member 22 may be milled by relatively feeding a rotating milling cutter about axis O. The cutter represents roller 31. The contour embodied by the milling cutter comprises the profile of the conical outside surface 30 and the profile of end surface 46, with only a narrow strip of the adjacent spherical surface with center O. The entire spherical portion of the bottom 33 will be described by this narrow strip of whatever small width, as the cutter is fed about sphere center O. The milling cutter has two or more radially adjustable blades that are radially relieved, so that the diameter of the cutter can be restored after sharpening by adjusting the blades. Both sides and the bottom of a way are simultaneously cut. Grinding could be performed with a grinding wheel somewhat smaller in diameter than the roller 31, but having the same profile, grinding with one side. As the grinding wheel is gradually dressed to a smaller diameter the workpiece is adjusted about its axis towards the grinding wheel.

Another way of grinding or cutting the sides and adjacent bottom surface portion of the ways 28 is with a grinding wheel or face-type milling cutter whose working portions lie on the surface of revolution in which two sides of diametrically opposite ways lie. Diametrically opposite ways have side and bottom surfaces that are coaxial surfaces of revolution with axis such as 28' in FIG. 2. The tool axis is made to coincide with this axis; and its one side matches opposite side surfaces of two diametrically opposite ways 28, one side on each way, and preferably also the adjacent portion of the bottom surface up to a radius slightly smaller than the radius of end edge 18 (FIG. 1). The rotary tool is mounted in a head that clears the inner cavity of member 22. It is advanced into a pair of diametrically opposite ways with its working side withdrawn axially from the surfaces it is to grind or cut, so that the tool can pass end edge 18. When its axis coincides with the common axis of said diametrically opposite ways it is moved along its axis to near-contact with the workpiece and then fed in axially. It finishes the surfaces in the end position of this feed. After a pair of opposite sides and adjacent bottom portions have been finished the tool is withdrawn axially and then withdrawn from the inside of the workpiece in the direction of axis 23 of the workpiece. The workpiece is indexed and a new pair of side surfaces is started on in the way described, until all are finished.

Outer member 95 (FIG. 11) and the other parts present no unusual production problems.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

I claim:

1. A universal joint comprising two members of which each has a plurality of ways equally spaced about an axis, a plurality of connecting elements engaging the ways of said two members for transmitting torque therebetween, each of said elements comprising two parts pivotally movable on each other, one of said two parts engaging a way of one of said two members while the other of said parts engages an adjacent way of the other member, each of said elements being separate from all other like elements of the universal joint, and means for maintaining said elements in the bisector plane of the axes of said two members, at least approximately.

2. A universal joint comprising an outer member and an inner member of which each has a plurality of ways spaced about an axis, the sides of the ways of both members being connected by bottoms, the ways of said inner member having bottoms that lie in a common convex spherical surface, a plurality of connecting elements engaging the ways of said two members for transmitting torque therebetween, each of said elements comprising two parts pivotally movable on each other, one of said parts engaging a way of said outer member while the other of said parts engages an adjacent way of said inner member, said other part having a concave spherical end surface matching the bottom surface of its engaged way, and means for maintaining said elements in the bisector plane of the axes of said members, at least approximately.

3. A universal joint according to claim 2, wherein the opposite side profiles of each way of the inner member are inclined to each other so that said way is narrower at the bottom than at the outside, said ways of the inner member extending all about a common center point lying on the axis of said member.

4. A universal joint according to claim 3, wherein the opposite side profiles of each way of the outer member are inclined to each other so that said way is widest at its bottom.

5. A universal joint according to claim 3, wherein the opposite side profiles of each way of the outer member are parallel straight lines connected by a concave bottom profile, so that said way has plane side surfaces parallel to the axis of said outer member.

6. A universal joint comprising an outer member with concave spherical inside surface and an inner member with convex spherical outside surface matching said inside surface and having direct contact therewith, each of said members having a plurality of ways spaced about an axis, the side surfaces of all said ways being connected by bottom surfaces, all the ways of said inner member extending about a common center point lying on the axis of said inner member, a plurality of connecting elements engaging the ways of said two members for transmitting torque therebetween, retaining means for guiding said elements, and means acting on said retaining means for maintaining said elements in the bisector plane of the axes of said members, at least approximately.

7. In a universal joint, a connecting element adapted to engage a pair of adjacent ways provided on two members of said joint, said element comprising an outer part for engaging and moving in a way of one of said members and an inner part for engaging and moving in a way of the other member, one of said parts being mounted on a pivot rigid with the other part to oscillate relative thereto, said pivot extending approximately within the confines of said element without projecting beyond.

8. In a universal joint, a connecting element adapted to engage a pair of adjacent ways provided on two members of said joint, said element comprising an outer part for engaging and moving in a way of one of said members and an inner part with concave end surface for engaging and moving in a way of the other member, said inner part being generally tapered in a section perpendicular to its said motion and being mounted to oscillate on a tapered pivot rigid with said outer part, said pivot extending approximately within the confines of said element without projecting beyond.

9. In a universal joint, an outer and a coaxial inner roller mounted to turn on each other and forming a connecting element separate from other like elements of said joint, the profiles of the working surfaces of said rollers being so inclined to each other that the mean profile normal of said inner roller intersects the mean profile normal of the diametrically opposite side of said outer roller inside of said outer roller and adjacent its working surface, said outer roller having an end surface of convex profile.

10. In a universal joint, a roller having a working surface and a thrust-carrying end surface joining at an angle and having a common axis passing through the center of the universal joint, the profile points of said end surface having distances from said center increasing with increasing distance from said working surface, so that the profile normals bypass said center.

11. A roller according to claim 10, wherein said thrust-carrying end surface is ring shaped and has a mean normal intersecting the roller axis at a distance from said center of the universal joint within one quarter of the smallest distance of said center from said end surface.

12. In a universal joint, a roller having a working surface and a thrust-carrying end surface joining at an angle and having a common axis passing through the center of the universal joint, said end surface having a convex profile tangent to and more curved than a circular-arc profile drawn about said center, the point of tangency having a larger distance from the roller axis than from said working surface.

13. A universal joint comprising an outer member and an inner member each having at least one pair of diametrically opposite ways, two diametrically opposite connecting elements engaging said ways to transmit torque therebetween, each of said elements comprising an outer part for engagement with said outer member and an inner part for engagement with said inner member, said parts being pivotally mounted on one another, a retainer for guiding said two elements, said retainer having two arms projecting laterally from a central portion and having circular guiding rings at the end of said arms, for holding said two elements, and means acting on said retainer for maintaining said elements in the bisector plane of the axes of said outer member and inner member, at least approximately.

14. A universal joint according to claim 13, wherein said inner member has a spherical outside surface contacting the inside surface of said outer member, wherein the outer part of each of said connecting elements is larger at said spherical surface than said inner part and reaches beyond said inner part, and wherein said guiding rings are recessed into said outer parts.

15. A universal joint comprising an outer member and an inner member each having an even number of and at least four ways arranged about an axis, connecting elements of said number engaging said ways, each of said elements having an inner part engaging a way of said inner member and an outer part overlapping said inner part and engaging an adjacent way of said outer member, an individual retainer for every pair of diametrically opposite elements, the several retainers being mounted to turn relatively to each other about a common axis, each retainer having a pair of circular guiding rings for holding a pair of diametrically opposite elements, said guiding rings being recessed into said outer parts, and means acting on said retainers for maintaining said elements in the bisector plane of the axes of said outer member and inner member, at least approximately.

16. A universal joint comprising a ball head and an outer member directly contacting one another along a spherical surface, said ball head and outer member having each a plurality of ways spaced about an axis and curved about a common center point, each of said ways having a bottom connecting opposite sides thereof, a plurality of connecting elements engaging the ways of said ball head and outer member, retaining means for guiding said elements, means acting on said retaining means for maintaining said elements in the bisector plane of the axes of said ball head and outer member, the last-named acting means being adapted to be made operative after insertion of all said elements into their ways.

17. A universal joint comprising a ball head and an outer member contacting along a spherical surface, said ball head and outer member having each a plurality of ways spaced about an axis, each of said ways having a bottom connecting opposite sides thereof, a plurality of connecting elements engaging the ways of said ball head and outer member, retaining means for guiding said elements, means acting on said retaining means for maintaining said elements in the bisector plane of the axes of said ball head and outer member, the last-named acting means being adapted to be made operative after insertion of all said elements into their ways and including a lever carrying three ball portions spaced in a straight line, wherein the intermediate ball portion is removably secured to said lever.

18. A universal joint comprising an outer member and an inner member each having a plurality of ways spaced about an axis, each of said ways having a bottom connecting opposite sides thereof, a plurality of connecting elements engaging the ways of said members, retaining means with a central bore, and aligning means acting on said retaining means for maintaining said elements aligned with the bisector plane of the axes of said members, said aligning means comprising a lever with three ball portions spaced in a straight line, guiding means constraining the centers of said ball portions to move along the axes of said outer member and of said central bore and of said inner member respectively, and means for displacing the ball portion at said inner member along the axis of said inner member in dependence of the angle between the axes of said outer and inner members.

19. A universal joint comprising an outer member and an inner member each having a plurality of ways spaced about an axis, each of said ways having a bottom connecting opposite sides thereof, a plurality of connecting elements engaging the ways of said members, retaining means with a central bore, and aligning means acting on said retaining means for maintaining said elements aligned with the bisector plane of the axes of said members, said aligning means comprising a lever with three ball portions spaced in a straight line, guiding means constraining the centers of said ball portions to move along the axes of said outer member and of said central bore and of said inner member respectively, and means for displacing the ball portion at said inner member along the axis of said inner member in dependence of the angle between the axes of said outer and inner members, said lever being attached to the inner member by a flexible cable passing through a flared opening of curved profile provided at the ball portion engaging said inner member.

References Cited in the file of this patent

UNITED STATES PATENTS

| | | |
|---|---|---|
| 1,436,785 | Thiemer | Nov. 28, 1922 |
| 2,010,899 | Rzeppa | Aug. 13, 1935 |
| 2,239,675 | Hanftal | Apr. 29, 1941 |
| 2,462,700 | Wingquist | Feb. 22, 1949 |
| 2,551,779 | Wingquist | May 8, 1951 |
| 2,662,381 | Wildhaber | Dec. 15, 1953 |
| 2,902,844 | Rzeppa | Sept. 8, 1959 |